US008849490B2

(12) United States Patent
Wyatt et al.

(10) Patent No.: US 8,849,490 B2
(45) Date of Patent: Sep. 30, 2014

(54) ELECTRIC DRIVE VEHICLE CONTROL SYSTEM

(75) Inventors: Christopher K. Wyatt, Oneco, FL (US); Ivan E. Fox, Mattoon, IL (US)

(73) Assignee: Hydro-Gear Limited Partnership, Sullivan, IL (US)

(*) Notice: Subject to any disclaimer, the term of this patent is extended or adjusted under 35 U.S.C. 154(b) by 74 days.

(21) Appl. No.: 13/561,414

(22) Filed: Jul. 30, 2012

(65) Prior Publication Data

US 2013/0030631 A1 Jan. 31, 2013

Related U.S. Application Data

(63) Continuation of application No. 12/209,074, filed on Sep. 11, 2008, now Pat. No. 8,234,026.

(60) Provisional application No. 60/971,419, filed on Sep. 11, 2007.

(51) Int. Cl.
*B60L 15/20* (2006.01)
*H04L 12/403* (2006.01)
*B60L 11/18* (2006.01)
*B60L 3/00* (2006.01)

(52) U.S. Cl.
CPC ........... *H04L 12/403* (2013.01); *B60L 2220/44* (2013.01); *Y02T 10/646* (2013.01); *Y02T 10/70* (2013.01); *Y02T 10/648* (2013.01); *Y02T 10/7258* (2013.01); *B60L 11/1803* (2013.01); *Y02T 10/7005* (2013.01); *Y02T 90/16* (2013.01); *B60L 3/00* (2013.01); *B60L 3/0092* (2013.01); *Y10S 903/902* (2013.01)
USPC .......... 701/22; 180/65.1; 180/65.21; 903/902

(58) Field of Classification Search
CPC ..... B60L 3/00; B60L 3/0092; B60L 11/1803; B60L 2220/44; H04L 12/403; Y02T 10/646; Y02T 10/70; Y02T 10/7005; Y02T 10/7258; Y02T 10/648; Y02T 90/16
USPC .................. 701/22; 180/65.1, 65.21; 903/902
See application file for complete search history.

(56) References Cited

U.S. PATENT DOCUMENTS 3,914,938 A 10/1975 Cornell et al.
4,568,866 A 2/1986 Floro et al.
(Continued)

FOREIGN PATENT DOCUMENTS

DE 4224359 C1 5/1993
DE 10148326 A1 4/2003
(Continued)

OTHER PUBLICATIONS

Van-Tung Phan, Hong-Hee Lee, "Dual Three-Phase Inverter Using a Single Processor to Drive Two Motors in Electric Vehicle Applications", Digital Object Identifier: 10, 1109/IFOST.2006. 312237, Publication Year: 2006, pp. 24-28.

(Continued)

*Primary Examiner* — Tuan C. To
(74) *Attorney, Agent, or Firm* — Neal, Gerber & Eisenberg LLP

(57) ABSTRACT

Electronic control systems and related control methods for controlling electric drive motors for propelling a vehicle and electric auxiliary motors for performing work. The apparatus is shown in use with a vehicle that includes a mowing deck. Features of the control systems allow for safe and efficient use of the vehicle. These features include a power take-off timeout, automatic fail-safe brake (parking), and customized drive characteristics.

20 Claims, 4 Drawing Sheets

(56) References Cited

U.S. PATENT DOCUMENTS

| | | | |
|---|---|---|---|
| 4,769,557 A | 9/1988 | Houf et al. | |
| 5,406,778 A | 4/1995 | Lamb et al. | |
| 5,522,778 A * | 6/1996 | Iwase et al. | 477/62 |
| 5,542,251 A | 8/1996 | Leibing et al. | |
| 5,588,498 A | 12/1996 | Kitada | |
| 5,630,625 A * | 5/1997 | Shaw | 280/838 |
| 5,642,711 A * | 7/1997 | Boner et al. | 123/379 |
| 5,667,029 A | 9/1997 | Urban et al. | |
| 5,794,422 A | 8/1998 | Reimers et al. | |
| 5,887,669 A * | 3/1999 | Ostler et al. | 180/53.4 |
| 5,934,051 A | 8/1999 | Hahn | |
| 5,975,736 A | 11/1999 | Simmons et al. | |
| 6,082,084 A | 7/2000 | Reimers et al. | |
| 6,109,009 A | 8/2000 | Benson | |
| 6,123,163 A | 9/2000 | Otsu et al. | |
| 6,242,873 B1 | 6/2001 | Drozdz et al. | |
| 6,523,334 B1 | 2/2003 | Dettmann | |
| 6,609,357 B1 | 8/2003 | Davis et al. | |
| 6,864,646 B2 | 3/2005 | Rahman et al. | |
| 7,007,446 B2 | 3/2006 | Dettmann | |
| 7,017,327 B2 | 3/2006 | Hunt et al. | |
| 7,035,115 B2 | 4/2006 | Walesa | |
| 7,100,717 B2 * | 9/2006 | Stancu et al. | 180/65.1 |
| 7,126,237 B2 | 10/2006 | Walters et al. | |
| 7,331,901 B2 * | 2/2008 | Busch | 477/110 |
| 7,610,975 B1 | 11/2009 | Gust et al. | |
| 7,690,458 B2 | 4/2010 | Ueda | |
| 7,801,653 B2 | 9/2010 | Sheidler et al. | |
| 7,815,546 B2 * | 10/2010 | Jagodzinski | 477/185 |
| 7,832,513 B2 | 11/2010 | Verbrugge et al. | |
| 7,855,901 B2 | 12/2010 | Oyobe et al. | |
| 7,946,365 B2 | 5/2011 | Aoyagi et al. | |
| 7,973,499 B2 | 7/2011 | Yoshioka | |
| 2004/0124026 A1 | 7/2004 | Walters et al. | |
| 2004/0160201 A1 | 8/2004 | Rahman et al. | |
| 2005/0065684 A1* | 3/2005 | Larson et al. | 701/36 |
| 2005/0109550 A1* | 5/2005 | Buglione et al. | 180/65.2 |
| 2005/0239598 A1* | 10/2005 | Bauerle et al. | 477/111 |
| 2006/0059879 A1 | 3/2006 | Edmond | |
| 2006/0253237 A1* | 11/2006 | Dannenberg et al. | 701/36 |
| 2007/0158120 A1* | 7/2007 | Lee et al. | 180/65.2 |
| 2007/0200428 A1* | 8/2007 | Buglione et al. | 303/89 |
| 2007/0204827 A1* | 9/2007 | Kishibata et al. | 123/179.5 |
| 2007/0215403 A1* | 9/2007 | Irikura | 180/307 |
| 2007/0221168 A1* | 9/2007 | Katrak et al. | 123/350 |
| 2008/0234096 A1 | 9/2008 | Joshi et al. | |
| 2008/0289309 A1 | 11/2008 | Gust et al. | |
| 2009/0000839 A1 | 1/2009 | Ishii et al. | |
| 2009/0065273 A1 | 3/2009 | Wyatt et al. | |

FOREIGN PATENT DOCUMENTS

| | | | |
|---|---|---|---|
| EP | 0151208 | | 8/1985 |
| EP | 1151892 A3 | | 11/2001 |
| EP | 1228917 A | | 8/2002 |
| EP | 1327547 A | | 7/2003 |
| EP | 1645456 A3 | | 7/2006 |
| GB | 2277780 A | * | 11/1994 |
| JP | 2001-320807 A | | 11/2001 |
| JP | 2003-291692 A | | 10/2003 |
| JP | 2004-100718 A | | 4/2004 |
| JP | 2007-037366 A | | 2/2007 |
| WO | WO 9956978 A1 | * | 11/1999 |
| WO | WO 148373 A1 | * | 7/2001 |
| WO | WO 2004011731 A1 | * | 2/2004 |
| WO | 2006/039520 A1 | | 4/2006 |
| WO | 2006/039521 A1 | | 4/2006 |
| WO | 2009/036208 A1 | | 3/2009 |
| WO | 2009/036211 A3 | | 3/2009 |
| WO | 2010/048561 A2 | | 4/2010 |

OTHER PUBLICATIONS

Williamson, S., Lukic, M., Emadi, A, "Comprehensive drive train efficiency analysis of hybrid electric and fuel cell vehicles based on motor-controller efficiency modeling", Power Electronics, IEEE Transactions on vol. 21, Issue: 3, Digital Object Identifier: 10,1109/TPEL,2006.872388, Publication Year: 2006, pp. 730-740.

Office Action dated Jan. 5, 2012 from U.S. Appl. No. 12/367,144 filed Feb. 6, 2009.

Tractors: Specifications; Electric Lawn Tractors and Conversion Kits; Nov. 19, 2006; http://electriclawntractor.com.

Edmond Electric Company Ltd.; Patent Pending, Tested and Proven Design . . . ;Electric Lawn Tractors and Conversion Kits—Patent Pending, Tested and Poven Design;Apr. 25, 2007; pp. 1-2; http://electriclawntractorcom/index.php?option=com_content&task=view&id=19&Itemid. . . .

Jacobsen, A Textron Company; Jacobsen E-Plex II, Riding Greens Mowers; pp. 1.2; Version 3.0, Jan. 2007.

Jacobsen, A Textron Company; Jacobsen E-Walk, Walking Green Mowers, pp. 1-2; Version 3.0; Jan. 2007.

Jacobsen, A Textron Company; The Toro Company, Mid-Duty Specifications: Electric e2065 Workman; Toro-Golf Course Management Workman, Apr. 24, 2007; http://www.toro.com/golf/vehicle/workman/midduty/e2065_specs.html.

International Search Report and Written Opinion of the International Searching Authority issued on Mar. 12, 2008 in connection with PCT/US2008/07606.

International Search Report and Written Opinion of the International Searching Authority issued on Mar. 20, 2009 with regard to PCT/US2008/076072.

Republished International Publication No. Wo 2009/036211 A3 together with the International Search Report.

International Search Report and Written Opinion of the International Searching Authority dated Jun. 4, 2010 with respect to International Application No. PCT/US2009/061929.

European Office Action issued on Jun. 29, 2009 with regard to European Patent Application No. 07 799 218.8.

* cited by examiner

ELECTRIC DRIVE VEHICLE CONTROL SYSTEM

RELATED APPLICATIONS

This application is a continuation application of U.S. patent application Ser. No. 12/209,074, filed Sep. 11, 2008, now U.S. Pat. No. 8,234,026, issued Jul. 31, 2012, which claims priority to U.S. Provisional Patent Application No. 60/971,419, filed on Sep. 11, 2007, all of which are incorporated by reference herein in its entirety.

TECHNICAL FIELD

This application is generally related to electrically powered vehicles, and more particularly to control systems, methods and processes for electric drive mechanisms of electrically powered vehicles, such as, for example, utility vehicles.

BACKGROUND OF THE INVENTION

Utility vehicles, such as, for example, lawn tractors, have generally relied upon internal combustion engines as the prime mover transferring power through mechanical linkages (gearing or belts), hydrostatic drive(s), continuously variable transmissions (CVTs), or other similar devices to propel the vehicle. However, manufacturers of these vehicles, especially lawn tractors used for lawn mowing, are under continuously increasing pressure to reduce environmental pollution caused by vehicle emissions, as well as fluid leaks and noise from the hydrostatic transmission or engine. Hence, utility vehicles utilizing electrically-powered systems have become a primary focus to address these and other issues with combustion-engine type vehicles.

SUMMARY OF THE INVENTION

The present invention comprises systems, methods and processes for electric drive mechanisms of electrically powered vehicles, such as, for example, utility vehicles. In a particular embodiment, electronic control processes are utilized to control electronic traction and auxiliary drive systems, such as a mower deck drive mechanism. In an embodiment incorporating a mowing deck, the control processes control, among other things, vehicle travel and mower deck cutting blade speed. In such an embodiment, the electric motors receive signals from the control system of the vehicle in accordance with programmed processes to control the transmission driving speed and power take-off (PTO), and, hence, the mower deck cutting blade operation. The systems, methods and processes of the present invention have many other applications in numerous types of electrically powered vehicles.

A better understanding of the objects, advantages, features, properties and relationships of the invention will be obtained from the following detailed description and accompanying drawings which set forth one or more illustrative embodiments that are indicative of the various ways in which the principles of the invention may be employed.

DETAILED DESCRIPTION OF THE DRAWINGS

Figure 1:
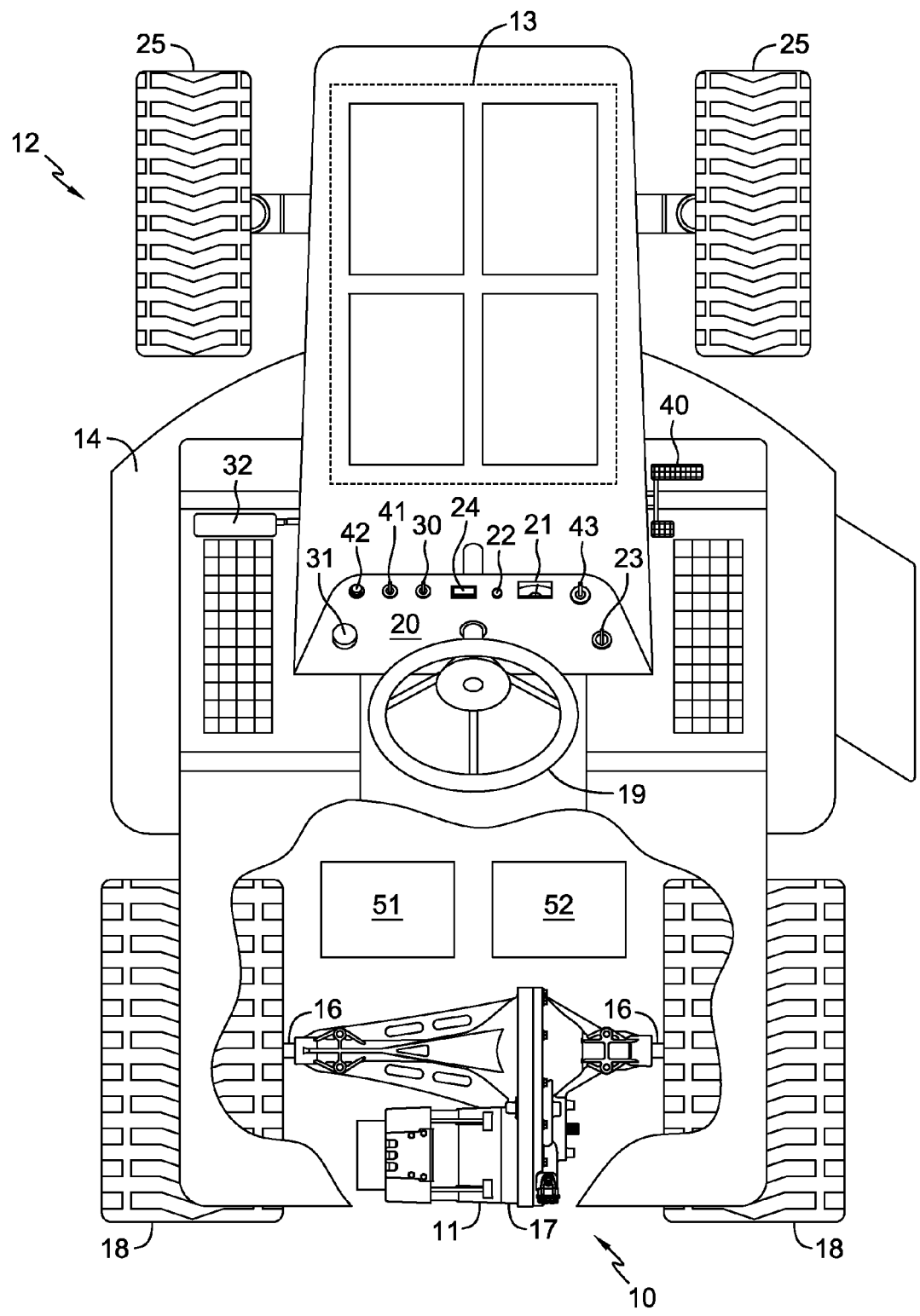
FIG. 1 is a top plan view of a vehicle incorporating an embodiment of an electrically powered vehicle with an embodiment of a typical operator control panel in accordance with the principles of the present invention.

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the present specification is intended to be taken as a whole and interpreted in accordance with the principles of the present invention as taught herein and understood by one of ordinary skill in the art. It should also be noted that references herein to specific manufactured components may be provided as preferred embodiments or exemplifications and should not be construed as limiting. In each case, similar or equivalent components from other manufacturers may be utilized as well.

FIG. 1 shows a vehicle 12 implementing one or more embodiments in accordance with the principles of the present invention. While vehicle 12 shown in FIG. 1 is a mowing vehicle, the principles of the present invention may be applied to other vehicles as well, such as, for example, utility vehicles, tractors, or other vehicles incorporating auxiliary systems (e.g., mower blades, augers, snow throwers, tillers, sweepers, spreaders, etc.) that can benefit from integrated control with a drive system. Vehicle 12 includes a power supply 13, a mower deck 14, a pair of driven wheels 18 and a pair of steered wheels 25. In an alternate embodiment (not shown), a single steered wheel may be used. In the embodiment shown, vehicle 12 also includes an electric transaxle 10 that drives a pair of output shafts or axles 16, which in turn drive a pair of wheels 18 that provide motion to vehicle 12. It should be noted that the use of the term wheel is intended to cover all types of wheels, as well as gears, linkages, or other mechanisms that may ultimately translate into a traction implement, such as, for example, an inner wheel of a track arrangement on a track vehicle.

Figure 2:
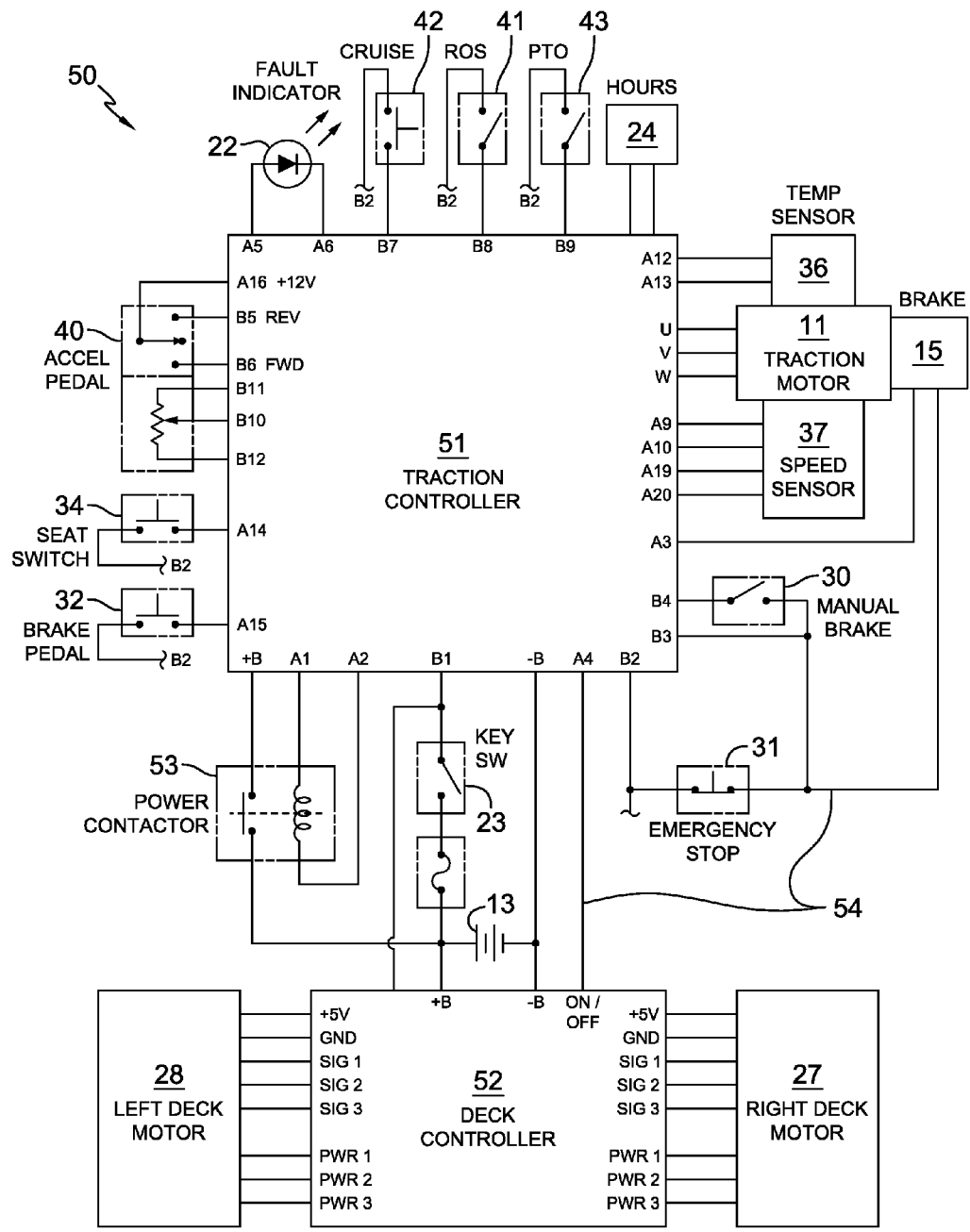
FIG. 2 is a block diagram illustrating an overview of the vehicle control system in accordance with the principles of the present invention.

Vehicle 12 includes a plurality of systems to perform various functions, such as vehicle control system 50, which is illustrated separately in FIG. 2. A general overview of the interaction between control system 50 and other portions of vehicle 12 is illustrated in the block diagram of FIG. 2. Traction controller 51 controls transaxle 10 and, when certain operational conditions are met, allows the operator of vehicle 12 to close PTO switch 43 to energize or allow activation of one or more functional outputs of an auxiliary controller in the form of deck controller 52, which can drive a variety of auxiliary equipment such as mower deck 14 (illustrated), or in other embodiments, a snow thrower, a tiller, sweeper brooms, or other implements. In the illustrated embodiment, traction controller 51 is an AC-0 inverter manufactured by Zapi, Inc. of Cary, N.C. Controller terminal and pin identifiers, such as A5, A6, B7, B8, etc., are shown for reference only. Other circuit arrangements/pin assignments are possible. Alternatively, many other types of processors, programmable logic controllers (PLCs), or the like could be utilized in accordance with the principles of the present invention.

Referring again to FIGS. 1 and 2, control system 50 includes traction controller 51 that receives signals from, and sends signals to, various other portions of control system 50 and vehicle 12. Transaxle 10 includes an electric motor 11 (which may be, for example, an asynchronous three-phase AC induction motor or any other electric motor type sufficient for driving a vehicle) that is drivingly attached to gearing within transmission 17, thereby transmitting torque to axle or output shafts 16, which causes rotation of driven wheels 18. In an alternate embodiment, vehicle 12 may include two transmissions, each independently driving one of a set of opposed axles, each having an associated drive wheel, such as in a zero-turn vehicle arrangement. In yet another embodiment, vehicle 12 may include two electric direct drive motors, each independently driving one of a set of opposed wheels without transmissions, such as in a zero-turn vehicle arrangement. The principles of the present invention apply to these types of arrangements as well.

Referring once again to FIGS. 1 and 2, traction controller 51 of control system 50 controls the speed and direction of vehicle 12. The speed of transaxle 10 can be adjusted by regulating the voltage frequency supplied to electric motor 11. Feedback used in the control of vehicle 12 is provided to traction controller 51 by speed sensor 37 of electric motor 11 on transaxle 10.

Speed sensor 37 of electric motor 11 may be a dual Hall Effect sensor that can sense and signal both a change in acceleration and rotation direction of electric motor 11. Feedback from speed sensor 37 enables execution of programming of desired characteristics of acceleration, deceleration, neutral, and change in direction via control software in connection with traction controller 51. The flexibility of programming allows features such as, for example, a panic stop ramped deceleration function, custom acceleration/deceleration curves, or other programmable functions to be implemented.

Electric motor 11 may be protected from damage by over-current and over-voltage sensors or circuitry (not shown) located in traction controller 51. MOSFETs (metal-oxide-semiconductor field-effect transistors) located within controller 51 are protected by the controller's capability to monitor current and temperature. A temperature sensor 36 may be located in electric motor 11 to protect electric motor 11 from overheating. Feedback from these sensors may be used to perform system checks, regulate vehicle speed, disable the PTO, initiate a controlled shutdown, sound or display a warning, or perform other functions relating to the vehicle. Additionally, in a particular embodiment, vehicle 12 may be driven in a forward or reverse direction by operator control of accelerator pedal 40, which may be a "rocker style," heel and toe operated pedal that includes one or more associated or integrated switches to signal direction and a potentiometer (or other signal-generating device) to signal desired speed to traction controller 51. Alternatively, the potentiometer utilized in the accelerator pedal 40 can be utilized to generate a signal representative of both speed and direction. Optionally, a separate F-N-R (Forward-Neutral-Reverse) switch could be employed, which is used in conjunction with a simple accelerator pedal that signals desired speed only. Such a switch can be mounted on dash 20. In yet another embodiment (not shown), two separate pedals could be used for forward and reverse directions of vehicle movement. This option allows manufacturers flexibility in choosing traditional operator controls or a different configuration. A wiring harness or assembly 54 may be used to electrically connect the various elements of control system 50. Wiring harness 54 may be configured so that wires carrying signals are grouped together and wires carrying power and drive signals are grouped together with appropriate shielding for signal integrity.

As shown in FIGS. 1 and 2, power supply 13 is provided to operate one or more systems of vehicle 12, including components of control system 50. In the embodiment shown, power supply 13 consists of four 12V batteries providing 48V power. Power is distributed from power supply 13, through power contactor 53, to traction controller 51. In the embodiment shown, power contactor 53 is a Model SW60 contactor manufactured by Albright International, Ltd. of Surbiton, UK (England). Power supply 13 is also in electrical communication with on-off key switch 23. With key switch 23 in the ON position, and with the presence of power at a specified voltage threshold from power supply 13, power contactor 53 enables traction controller 51 after diagnostic checks verify that traction controller 51 is ready to run.

Referring again to FIGS. 1 and 2, movement of rocker style accelerator pedal 40 (or other accelerator mechanism) signals traction controller 51 of an operator-directed acceleration or deceleration of vehicle 12 in either the forward or reverse direction. The input signals from accelerator pedal 40 determine the direction and speed of operation of transaxle 10.

As explained above, vehicle 12 includes operator interfaces, switches, sensors, and other components that interact within control system 50 to effectuate control of vehicle 12. Brake pedal 32 of vehicle 12 actuates a brake system located either as part of transaxle 10 or as a separate device or system. The brake system may be based on regenerative braking, mechanical braking, or a combination. Steering wheel 19 or other steering mechanism or control interface facilitates turning of vehicle 12 by mechanical, electro-mechanical, hydro-static, or other known methods of controlling positioning of steered wheels 25. In the illustrated embodiment, vehicle dash 20 or an equivalent includes an indicator LED (light emitting diode) or lamp 22, vehicle key switch 23, PTO switch 43, cruise switch 42, reverse operating system (ROS) switch 41, brake switch 30, emergency stop switch 31, battery gauge 21 and hour meter 24. FIG. 2 illustrates an embodiment of some of these controls, switches, sensors and components in more detail.

The following description describes a representative array of elements. Some of these elements may be optional for a particular vehicle configuration. In other configurations, additional elements may be desirable. For example, a speed sensor 37 or temperature sensor 36 may be unnecessary in some applications. In another example, additional sensors may be desired to improve operator satisfaction or safety. Such sensors may include thermocouples, proximity aids, vehicle attitude or inclination sensors, and other devices relevant to the operation of a typical vehicle. Furthermore, activation of, for example, a vehicle attitude or inclination sensor may be used to initiate a secondary function, such as transmission of an emergency signal to a remote receiver in the event of a vehicle rollover.

In an embodiment, control system 50 controls three general categories of functionality of vehicle 12: (1) diagnostics and start-up associated with traction controller 51 to enable control system 50 for vehicle 12, (2) operational parameters or constraints for traction controller 51 during operation, and (3) operational parameters or constraints for other features of traction controller 51 and deck controller 52 systems. Each of these general categories is discussed below.

There are several control aspects related to starting and running vehicle 12. Because vehicle 12 is accelerated electrically, a diagnostics routine is performed on the electronics prior to permitting vehicle 12 to be operated. If the battery charge does not meet the minimum threshold, traction controller 51 will prevent start-up. Referring to FIG. 2, when key switch 23 is rotated to the ON position, traction controller 51 performs an array of diagnostics. Once the diagnostics have successfully been completed, a relay permits actuation of power contactor 53. As will be noted in more detail later, traction controller 51 continuously monitors a variety of conditions and has the ability to shut down the system by way of disengaging power contactor 53. Once power contactor 53 is engaged, functionality of the fail-safe, normally-closed brake 15 is checked. Part of this check involves verifying the brake holding capacity at start-up to ensure serviceability. Traction controller 51 drives the electric motor 11 to the required holding torque specification and monitors whether the drive wheels 18 move. If the check fails, the controller can be programmed to allow operation in a reduced power mode or disable the electric drive system. The controller can also be programmed to bypass the fail-safe holding torque check.

As the system continues performing diagnostics that will enable traction controller 51 and mower deck controller 52, seat switch 34 is checked to verify operator presence. Functionality of traction controller 51 is checked and the drive state is enabled. The neutral state of vehicle 12 is verified. The inactive state of power take-off switch 43 and cruise switch 42 is also verified. The position of ROS switch 41 is checked against the drive state of vehicle 12. After the diagnostic program passes checks, LED indicator lamp 22 indicates a "No Error" state, and power contactor 53 is switched on to enable propelling vehicle 12. In a particular embodiment, other diagnostic options may be selectively included via software, such as, for example, limited or disabled functionality relative to battery capacity or state.

Referring again to FIGS. 1 and 2, when power contactor 53 is switched on, traction controller 51 is enabled. Traction controller 51 receives signals from various inputs of vehicle 12 that relate to motive operation of vehicle 12. Initially, a check for inputs from accelerator pedal 40 is performed. If accelerator pedal 40 has been moved out of the neutral position (also referred to as PEDAL OFF in FIG. 3), fail-safe brake 15 is disengaged to allow the vehicle to travel the respective speed and direction indicated. Acceleration and deceleration characteristics can be programmed via software in connection with traction controller 51, which allows selection of acceleration or deceleration curves with different characteristics for greater operator satisfaction and control based on operator inputs or vehicle conditions. For example, deceleration curves may be programmed for a coast-to-stop function or for a panic stop function when encountering a sudden hazard. A panic-stop may be initiated by operator input or by object detection sensor (not shown) input to traction controller 51. Other sensors or system diagnostics may also be used to initiate a system-controlled vehicle stop. The acceleration or deceleration curves can be predetermined and stored in a memory associated with the controller, or optionally can be customizable and programmed by a manufacturer (including original equipment manufacturers and authorized service technicians) given certain safety constraints. These programmed curves, at the manufacturer's election, can be made selectable by an operator of the vehicle.

Once traction controller 51 is enabled, and when programmed safe operating conditions are met, PTO switch 43 can be activated to run auxiliary or deck motors 27 and 28 of mower deck 14 (or other optional attachment or implement). The current draw by drive motor 11 can be regulated for control. For example, the current draw can be regulated manually with the addition of an operator-manipulated potentiometer (e.g., knob, lever, or slide control—not shown). Optionally, the current draw can be automatically regulated via traction controller 51 to slow vehicle 12 if induced loads become high, such as when mowing thick or tall grass or when traveling up a steep grade, or if power consumption exceeds programmed parameters. This can be accomplished by enabling communication between traction controller 51 and deck controller 52, such as via CAN (Controller Area Network) bus or other control unit connection standard. Such regulation lowers power consumption, extends battery life between charges and optimizes operation levels to extend service life. Other signals may be desirable to enable control system 50 to provide safer and more effective operation of vehicle 12. Traction controller 51 may provide an indication of the operating condition of the traction or deck drive systems by way of an indicator such as LED or indicator lamp 22 or by way of other operator interfaces which may be visual, audible, or a combination of visual and audible.

The remaining control aspects of traction controller 51 relate to operation of deck motors 27 and 28 associated with mower deck 14. Once traction controller 51 is enabled, the operator has the ability to activate deck controller 52. Deck controller 52 drives mower deck motors 27 and 28 which, in the embodiment shown, are controlled independently by two separate circuit boards (one for each motor) housed within deck controller 52. Operator actuation of PTO switch 43, when programmed safe operating conditions are met, will cause deck controller 52 to power right deck motor 27 and left deck motor 28, which drive the cutting blades of mower deck 14. In a particular embodiment, deck motors 27 and 28 are brushless DC (BLDC) motors, which each include Hall Effect sensors that provide feedback information to deck controller 52. Optionally, sensorless PMSMs (permanent magnet synchronous motors) may be employed utilizing other feedback arrangements known in the art, such as motor position and timing estimates based on software algorithms. A temperature sensor (not shown) is also included in each deck motor to provide feedback to deck controller 52 to prevent overheating of deck motors 27 and 28. Additionally, over-current and over-voltage sensors (not shown) are included in deck controller 52 to prevent damage to deck motors 27 and 28. Again, optionally, other feedback arrangements can be utilized, such as motor position and timing estimates, voltage and current estimates, etc., based on software algorithms. In an alternate embodiment (not shown), feedback from sensors in deck motors 27 and 28 and deck controller 52 can be integrated with feedback from sensors providing information to traction controller 51 and used to regulate the speed of vehicle 12. This integration can be used to limit power consumption and proportionately adjust for the load each drive encounters with respect to available power. As noted above, this can be accomplished by utilizing a CAN bus. Additionally, axle shafts 16 may have speed sensors (not shown) associated with them. Speed sensors may be used for several purposes, such as, for example, determining the neutral position or neutral state of transaxle 10, which allows the controller to presume transaxle 10 is in the neutral position when the neutral position or state is sensed. Speed sensors associated with axle shafts 16 would, among other things, enhance the ability to establish the non-rotating condition of axle shafts 16, thereby further defining the neutral position. The controller system could automatically initiate a vehicle speed reduction in the mowing state and make further adjustments under increasing loads. This can be triggered alternatively by current draw or temperature constraints.

According to another aspect, deck controller 52 allows for a programmable timeout if vehicle 12 is stopped for a set period of time. Other power conservation and safety features can be readily programmed, such as a multi-stage shutdown sequence to protect and manage power supply 13 when the charge has deteriorated to specified levels. In a particular embodiment, the first time the specified minimum voltage level is reached and sensed for a predetermined period (5 seconds, for example), the deck motors 27 and 28 associated with deck 14 are disabled and a reduced vehicle speed is implemented to reduce the load on power supply 13. If the voltage then draws down to the minimum voltage level and is sensed for more than a predetermined period a second time, the traction drive speed is reduced again (to 20% of maximum, for example). If the minimum charge level is reached and sensed for a predetermined period a third time, the traction drive may be disabled, stopping the vehicle. Optionally, the vehicle may enter a hibernation state wherein travel modes are disabled, but minimal power is still available to energize, for example, a visual display, emergency lights, or an emergency signal transmitter while key switch 23 remains in the ON position.

An alarm to remind the operator to recharge power supply 13 can be employed at vehicle shutdown to help prevent deep battery discharge and prepare vehicle 12 for next use. A plug-in "smart" charger may be used to charge power supply 13. This "smart" charger may be on-board vehicle 12 or external to vehicle 12. Another optional feature is employment of regenerative braking of the electric motor(s) to charge the system power supply during braking or when the vehicle is coasting.

When attempting to move in reverse with a mower deck engaged, a reverse operating system (ROS) typically stops the blades of the mower deck by removing power from an electric clutch-brake or by killing the prime mover to stop the vehicle. In the embodiment shown, closing ROS switch 41 allows the operator to bypass this function to permit operation of deck motors 27 and 28 and associated mower blades when accelerator pedal 40 is moved to a position indicating reverse travel of vehicle 12. This ROS function is facilitated by the interaction between traction controller 51 and deck controller 52. The ROS function allows uninterrupted mowing in reverse without worry of a time-out condition. Only when vehicle 12 is shifted out of reverse will the ROS function be deactivated. Once shifted out of reverse, this mode can only be reinitiated by activating ROS switch 41 before shifting vehicle 12 back into reverse. The vehicle must be in either neutral or forward to activate the ROS switch 41. A 2-position ROS switch 41 is indicated in FIG. 2, but a momentary switch or other switch forms could be substituted. Alternatively, an ROS position can be added to key switch 23, thereby eliminating the need for separate ROS switch 41. Additionally, traction controller 51 can be programmed to automatically slow vehicle 12 when moving in reverse and/or when mowing in reverse. Audible and/or visual alarms (which may include error codes), object detection systems, etc., may also be activated when moving and/or mowing in reverse.

Software switches can be used to slow the vehicle, stop the vehicle or blades automatically, or enable auxiliary functions when certain operating, alarm, or emergency conditions are met or encountered while operating vehicle 12. As an additional safety feature, brake 15 may be configured to engage traction drive motor 11 when vehicle 12 is stopped or stalled. A manual release cable (or other linkage) may be used with brake 15 to allow the operator to disengage the brake in order to move vehicle 12. The manual release cable may be combined with an integrated switch in communication with controller 51 to ensure that vehicle 12 is disabled when moving vehicle 12. Functionally, this gives the operator a bypass option to push or tow the vehicle.

The flexible programming capability of mower deck controller 52 driving the blades in mower deck 14 allows inclusion of a slight delay and/or ramping up to optimal cutting speed for both safety and energy conservation. Another feature that can be implemented is a blade stop function that performs a controlled stop of mower blades when either PTO switch 43 is deactivated or when key switch 23 is deactivated. For example, a capacitor in deck controller 52 can latch power so that when key switch 23 is switched off before PTO switch 43 is deactivated, mower deck controller 52 can back-drive deck motors 27 and 28 to stop mower blades within a programmed interval instead of allowing them to coast to a stop. For example, this programmed interval may be specified as 5 seconds or some other specification corresponding to an industry standard such as ANSI (American National Standards Institute) or an OEM (original equipment manufacturer) specification. Controlled braking of mower blades can also be accomplished by utilizing regenerative braking or mechanical braking.

Additionally, deck controller 52 may receive a signal from traction controller 51 to stop deck motors 27 and 28 when vehicle 12 has not moved for a programmed time interval, or if vehicle 12 exceeds a programmed maximum travel speed (axle speed sensors, for example, can enable both of these functions), or if other vehicle operational parameters are exceeded.

Figure 3:
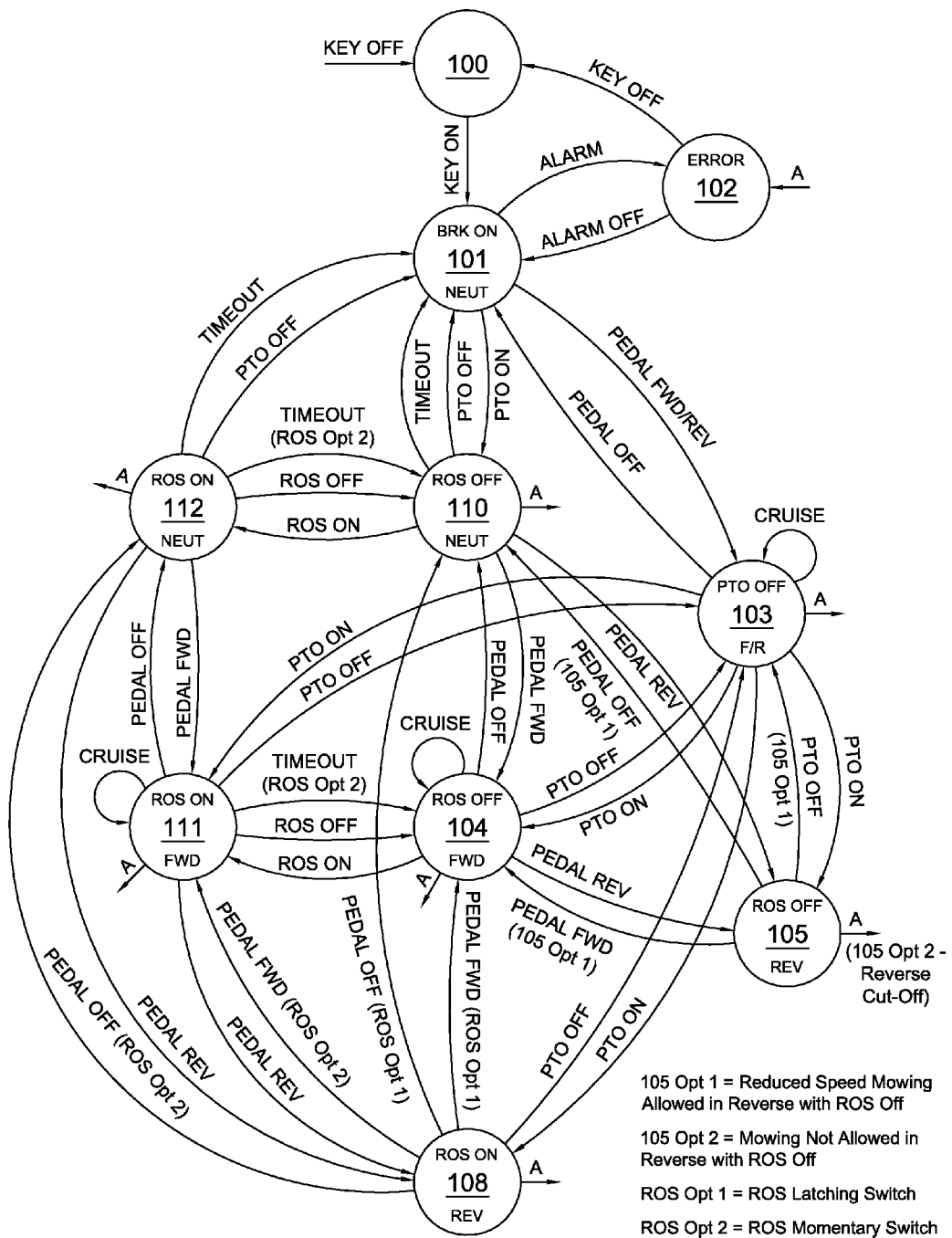
FIG. 3 is a bubble diagram of the various operating states of the electronic traction control system shown in FIG. 2.

Turning now to FIG. 3 (the traction controller 51 state map), various combinations of actuator and switch positions define various states for traction, PTO, ROS, cruise, key switch, sensors and errors while utilizing operating control system 50 functions as illustrated. Illustrated are 10 different preferred states of operation for traction controller 51 and interrelationships of these states.

The first state 100 is the vehicle OFF state in which vehicle 12 is powered down and controllers are disabled with key switch 23 in the OFF position. When key switch 23 is turned to the ON position, control passes to state 101, in which traction controller 51 is powered and begins processing.

State 101 is a diagnostic and preparation to operate state, which includes a ready or standing state, if diagnostics pass. If diagnostics fail, state 101 passes to error state 102 and an alarm is actuated. Any of the following states described herein can pass to error state 102 if they fail any of the conditions outlined for operation within a particular state. State 101 consists of key switch 23 on, internal diagnostics pass, PTO switch 43 off, ROS switch 41 off, cruise switch 42 off, operator in seat (actuating seat switch 34), foot off accelerator pedal 40 (in neutral), and manual brake switch 30 off. Also, electric brake 15 coil resistance is measured to determine presence of the coil. Optionally, the brake holding capacity check, as previously described, may be employed as well. If all of these conditions are met, power contactor 53 is closed. If the operator then actuates PTO switch 43, control passes to state 110 and the PTO timeout timer is set. Alternatively, if the operator first actuates the accelerator pedal 40, a test of brake 15 is performed. If the brake test is passed, the controller 51 passes control to state 103.

State 102 is an error state in which errors can be categorized as recoverable or non-recoverable. For non-recoverable errors, control remains in state 102 until key switch 23 is turned off. Recoverable errors can be resolved without cycling key switch 23 and, when resolved, the alarm is deactivated. Non-recoverable errors occur when the controller shuts off the PTO, shuts down the vehicle for not meeting a specified minimum voltage requirement, a hardware failure is detected, a diagnostic failure occurs, seat switch 43 is detected open in a state other than state 101 (recoverable error in state 101), or a test of brake 15 fails. Recoverable errors may be defined to include, for example, a condition when the operator is not in the seat, an accelerator is not in neutral, a manual brake release switch is in an ON position, etc. Any alarm or emergency condition (for both recoverable and non-recoverable errors) encountered by traction controller 51 or deck controller 52 will result in passing control to state 102 and stopping of both vehicle 12 and deck 14 blades. If PTO switch 43 was on before entering error state 102, it will be necessary to cycle PTO switch 43 after recovery from the error in order to resume operation of mower deck 14 motors 27 and 28.

State 103 is a transport state where vehicle 12 is in a travel-only mode. State 103 consists of key switch 23 on, internal diagnostics pass, PTO switch 43 off, ROS switch 41 on or off, cruise switch 42 on or off, operator in seat (actuating seat switch 34), accelerator pedal 40 in either forward or reverse and maximum speed enabled. The sequence starts with the operator closing seat switch 34 and then actuating accelerator pedal 40. A test of brake 15 is performed by traction controller 51 and, if passed, brake 15 is released and electric motor 11 is started in the direction signaled by the operator's input. If the PTO is activated while in state 103, controller 51 passes control to state 104, 105, 108, or 111, depending on a combination of accelerator pedal 40 position (forward or reverse) and ROS switch 41 position (on or off). If traction controller 51 determines it should pass control to state 105 (attempted reverse mowing with ROS off), then either vehicle 12 speed is greatly reduced and mowing is allowed (referenced as "105 Opt 1" in FIG. 3), or, if a reverse cut-off function is selected in the software, then mowing is not allowed (referenced as "105 Opt 2" in FIG. 3) and a non-recoverable error is generated and control passes to state 102. If control passes to state 104, 108, or 111, vehicle 12 speed is limited to a programmed forward mowing speed. Cruise switch 42 will only function if traveling forward and then the speed is maintained while traveling forward. Activating cruise switch 42 while traveling forward "freezes" the actual current vehicle speed. The cruise condition is terminated if brake pedal 32 is depressed, or accelerator pedal 40 is moved into reverse, or accelerator pedal 40 is pressed forward further than the "frozen" position, or cruise switch 42 is actuated while the accelerator pedal is in neutral. While in cruise mode, if accelerator pedal 40 is pressed forward and cruise switch 42 is actuated again, the "frozen" cruise value will be updated, reflecting the new accelerator position. When accelerator pedal 40 is moved into the neutral position (represented by the PEDAL OFF notations in FIG. 3, as mentioned previously), vehicle 12 stops, and when accelerator pedal 40 remains in the neutral position for a specified, programmed time interval (such as, for example 0.4 seconds), traction controller 51 will return to state 101 and engage brake 15. If manual brake switch 30 is activated, controller 51 overrides accelerator pedal 40, forces electric motor 11 to zero rpm, stops vehicle 12 and engages brake 15. When operating in state 103, if ROS switch 41 is in the ON position and PTO switch 43 is then switched to the ON position, traction controller 51 will jump to state 111 if moving forward and state 108 if moving in reverse. Conversely, if ROS switch 41 is in the OFF position and PTO switch 43 is then switched to the ON position, traction controller 51 will jump to state 104 if moving forward and state 105 if moving in reverse.

State 104 is the forward mowing state with ROS off, traveling at a reduced working speed. State 104 consists of key switch 23 on, internal diagnostics pass, PTO switch 43 on, ROS switch 41 off, cruise switch 42 on or off, operator in seat (actuating seat switch 34), accelerator pedal 40 in forward and working speed reduction enabled. When accelerator pedal 40 is moved into the neutral position, vehicle 12 stops, and when accelerator pedal 40 remains in the neutral position for a specified, programmed time interval, traction controller 51 jumps to state 110 and engages brake 15. When PTO switch 43 is switched off, traction controller 51 jumps to state 103 and sends a signal to the deck controller 52 (or other auxiliary controller, depending on configuration) to stop deck motors 27 and 28. When accelerator pedal 40 is moved to the reverse position, control jumps to state 105 and vehicle 12 transitions from forward travel to reverse travel, if allowed by software settings. Alternatively, when accelerator pedal 40 is moved to the reverse position, control jumps to state 105 and then to error state 102 if not allowed by software settings. If ROS switch 41 is switched on, traction controller 51 jumps to state 111. If a momentary ROS switch 41 is used (referenced in FIG. 3 as "ROS Opt 2"), the timeout feature is set before transferring to state 111.

State 105 is the attempted reverse mowing with ROS off state. State 105 consists of key switch 23 on, internal diagnostics pass, PTO switch 43 on, ROS switch 41 off, cruise switch 42 off, operator in seat (actuating seat switch 34), accelerator pedal 40 in reverse and either a speed reduction function or a cut-off function enabled. Depending on software settings, state 105 either allows mowing in reverse at reduced speed when accelerator pedal 40 is in the reverse position (referenced in FIG. 3 as "105 Opt 1"), or it does not allow any mowing (referenced in FIG. 3 as "105 Opt 2—Reverse Cut-Off") and control is passed to state 102 and an alarm is generated. If reduced speed mowing is allowed in state 105, the reduced speed may be programmed at, for example, approximately one foot per second maximum for safety, or other specification corresponding to an industry standard such as ANSI or an OEM specification. If not allowed, and control is passed to state 102 as mentioned above, this is a non-recoverable error, so key switch 23 must be turned off and back on to proceed. ROS switch 41 is disabled while in state 105, so it will not function if switched on while in state 105. Under "105 Opt 1", when accelerator pedal 40 is moved to the neutral position, vehicle 12 stops, and when accelerator pedal 40 remains in the neutral position for a specified, programmed time interval, traction controller 51 jumps to state 110 and brake 15 is applied. If PTO switch 43 is switched off, control jumps to state 103 and deck motors 27 and 28 are stopped. If accelerator pedal 40 is moved into forward position, traction controller 51 jumps to state 104 and vehicle 12 transitions from reverse travel to forward travel.

State 108 is the reverse mowing state with ROS on, operating at a reduced working speed. State 108 consists of key switch 23 on, internal diagnostics pass, PTO switch 43 on, ROS switch 41 on, cruise switch 42 off, operator in seat (actuating seat switch 34), accelerator pedal 40 in reverse and working speed reduction enabled. When PTO switch 43 is switched off, traction controller 51 jumps to state 103 and deck motors 27 and 28 are stopped. If a latching ROS switch 41 is used (under "ROS Opt 1"), when accelerator pedal 40 is moved into the neutral position, vehicle 12 stops, and when accelerator pedal 40 remains in the neutral position for a specified, programmed time interval, traction controller 51 jumps to state 110 and brake 15 is applied. If accelerator pedal 40 is moved into forward position, traction controller 51 jumps to state 104 (under "ROS Opt 1") and vehicle 12 transitions from reverse travel to forward travel. If a momentary ROS switch is used (under "ROS Opt 2"), when accelerator pedal 40 is moved to the neutral position, vehicle 12 stops, and when accelerator pedal 40 remains in the neutral position for a specified, programmed time interval, traction controller 51 jumps to state 112 and brake 15 is applied. If accelerator pedal 40 is moved into forward position, traction controller 51 jumps to state 111 (under "ROS Opt 2") and vehicle 12 transitions from reverse travel to forward travel.

State 110 is a temporary, stationary vehicle state with PTO switch 43 on and ROS switch 41 off. State 110 consists of key switch 23 on, internal diagnostics pass, PTO switch 43 on, ROS switch 41 off, cruise switch 42 off, operator in seat (actuating seat switch 34), accelerator pedal 40 in neutral, working speed reduction enabled and electric brake 15 applied. When the PTO timeout has elapsed, PTO switch 43 is switched off by the software and traction controller 51 jumps to state 101. If accelerator pedal 40 is moved into the forward position, traction controller 51 will jump to state 104 or, if moved into the reverse position, to state 105. If ROS switch 41 is switched on, traction controller 51 will jump to state 112. If a momentary ROS switch 41 is used ("ROS Opt 2"), traction controller 51 sets the ROS timeout timer before transfer to state 112.

State 111 is the forward mowing state with ROS on (and which enables a timeout function for the ROS under "ROS Opt 2"). State 111 consists of key switch 23 on, internal diagnostics pass, PTO switch 43 on, ROS switch 41 on, cruise switch 42 on or off, operator in seat (actuating seat switch 34), accelerator pedal 40 in forward and working speed reduction enabled. If accelerator pedal 40 is moved into reverse position, traction controller 51 jumps to state 108 and vehicle 12 transitions from forward travel to reverse travel. When PTO switch 43 is switched off, traction controller 51 jumps to state 103 and deck motors 27 and 28 are stopped. When accelerator pedal 40 is moved to the neutral position, vehicle 12 stops, and when accelerator pedal 40 remains in the neutral position for a specified, programmed time interval, traction controller 51 jumps to state 112 and brake 15 is applied. If ROS switch 41 is switched off, traction controller 51 jumps to state 104. If a momentary ROS switch 41 is used ("ROS Opt 2"), and if the ROS timeout elapses, controller 51 jumps to state 104.

State 112 is a temporary, stationary vehicle state with ROS switch 41 and PTO switch 43 both on (and which enables a timeout function for the ROS under "ROS Opt 2"). State 112 consists of key switch 23 on, internal diagnostics pass, PTO switch 43 on, ROS switch 41 on, cruise switch 42 off, operator in seat (actuating seat switch 34), accelerator pedal 40 in neutral and working speed reduction enabled. When the PTO timeout elapses, traction controller 51 jumps to state 101 and deck motors 27 and 28 are stopped. If accelerator pedal 40 is moved into the forward position, traction controller 51 will jump to state 111 or, if moved into the reverse position, to state 108. If ROS switch 41 is switched off, traction controller 51 jumps to state 110. If a momentary ROS switch 41 is used ("ROS Opt 2"), and if the ROS timeout elapses, controller 51 jumps to state 110.

Figure 4:
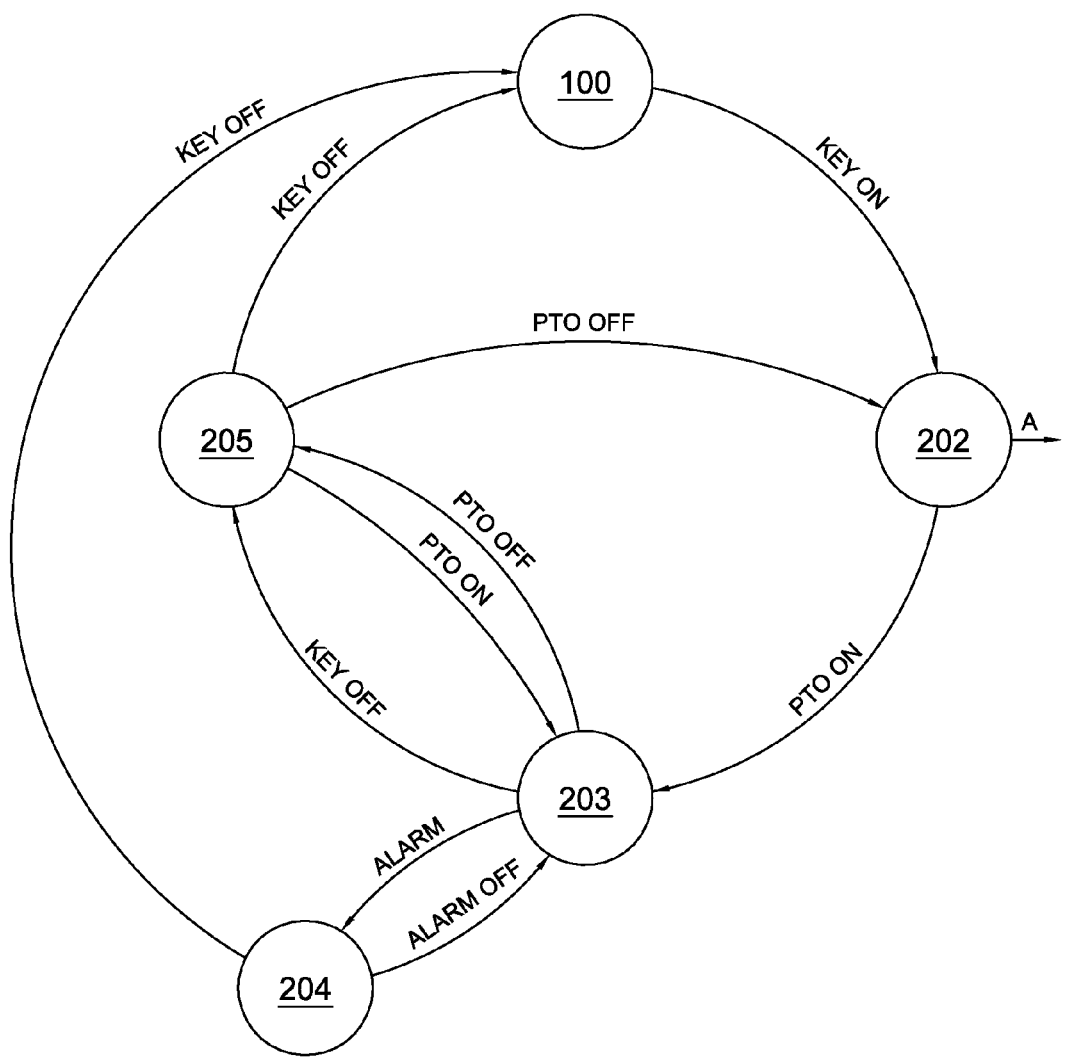
FIG. 4 is a bubble diagram of the various operating states of the electronic mower deck drive control system shown in FIG. 2.

Turning now to FIG. 4 (the deck controller 52 state map), various combinations of actuator and switch positions define various states for the PTO, key switch and errors while utilizing operating controller system functions as illustrated. Illustrated are 5 different states of operation for deck controller 52 and the interrelationships of these states.

State 100, as previously described above, is the vehicle OFF state in which vehicle 12 is powered down and controllers are disabled with key switch 23 in the OFF position. When key switch 23 is switched on, and after diagnostics have passed, deck controller 52 is enabled by controller 51 and deck control passes to state 202.

In state 202, deck controller 52 is enabled with key switch 23 on and PTO switch 43 off. When PTO switch 43 is switched on, deck controller 52 jumps to state 203.

In state 203, deck controller 52 is enabled with key switch 23 on and PTO switch 43 on to power mower deck motors 27 and 28. From state 203, deck controller 52 transfers control to one of two possible states, error state 204 or PTO disabled state 205.

State 204 is the error state which is entered if one or more deck motors 27 and 28 are outside the programmed allowable temperature, current, or voltage range. Once the error is removed, operator cycling of PTO switch 43 once (after a programmed delay of approximately 5 to 10 seconds to prevent overheating of MOSFETs or other sensitive electronic components) will return control to state 203 and start deck motors 27 and 28 running again. If key switch 23 is placed in the OFF position while in state 204, deck controller 52 will jump to state 100.

In state 205, the PTO is disabled. Mower deck 14 cutting blades are stopped (within a programmable time limit governed by industry standards or OEM specifications for safety) by pulse width modulation (PWM) control of deck motors 27 and 28. When PTO switch 43 is switched off (thereby removing the PTO ground), deck controller 52 jumps to state 202 from state 205. If PTO switch 43 is switched back on and the ground signal is reapplied at state 205 before the motor stopping function is completed, deck controller 52 returns to state 203. If the key remains off in state 205, deck controller 52 returns to state 100.

FIGS. 1 and 2 illustrate some of the various inputs that may be connected via operator-actuated switches to traction controller 51. Traction controller 51 as illustrated allows an operator to use an emergency stop switch 31, brake switch 30, or the key switch 23 OFF position to initiate engagement of fail-safe brake 15 on electric motor 11. Cruise switch 42 can be engaged to maintain a constant travel speed input which is cancelled upon receiving a brake pedal 32 or accelerator pedal 40 input signal outside a set or programmed range. If the set range is exceeded, cruise switch 42 must be turned off and back on again to reactivate the cruise function. As mentioned previously, a separate F-N-R switch may be added if rocker style accelerator pedal 40 (shown) is replaced by a different type of accelerator pedal. Optionally, hand-operated lever or joystick controls may be used in lieu of pedal(s) and steering wheel.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof

What is claimed is:

1. A control system for an electric drive system of a vehicle having at least one electric drive motor in communication with a driven wheel of the vehicle, the control system comprising:
    an accelerator of the vehicle capable of causing generation of an accelerator input signal;
    a plurality of sensors mounted within the vehicle and each providing a sensor input signal;
    a drive controller in communication with the at least one electric drive motor to facilitate adjustment thereto based on the accelerator input signal and at least one of the sensor input signals;
    a drive controller memory in communication with the drive controller for storing first computer-executable instructions;
    an auxiliary controller in communication with at least one electric auxiliary motor and the drive controller to facilitate adjustment of the at least one electric auxiliary motor; and
    an auxiliary controller memory in communication with the auxiliary controller for storing second computer-executable instructions.

2. The control system of claim 1, wherein the auxiliary controller memory comprises the second computer-executable instructions for causing the auxiliary controller to perform the steps of:
    receiving one or more signals from either one or both of at least one sensor of the plurality of sensors and the drive controller;
    receiving a signal from the drive controller indicating that the vehicle has been stopped for a predetermined period of time; and
    stopping the at least one electric auxiliary motor if the vehicle has been stopped for the predetermined period of time.

3. The control system of claim 1, wherein the drive controller memory comprises the first computer-executable instructions for causing the drive controller to perform the steps of:
    determining whether the vehicle is in a start-up mode;
    driving the at least one electric drive motor to a predetermined holding torque specification while a vehicle brake is engaged;
    monitoring whether the driven wheel of the vehicle moves; and
    disabling driving of the at least one electric drive motor if the driven wheel of the vehicle moves.

4. The control system of claim 1, wherein the drive controller memory comprises the first computer-executable instructions for causing the drive controller to perform the steps of:
    monitoring a load on the at least one electric auxiliary motor;
    determining if a predetermined load on the at least one electric auxiliary motor has been exceeded; and
    decreasing a speed of the at least one electric drive motor when the predetermined load on the at least one electric auxiliary motor has been exceeded.

5. The control system of claim 1, wherein the at least one electric auxiliary motor drives at least one cutting blade for mowing.

6. The control system of claim 1, wherein the auxiliary controller is configured to back drive the at least one electric auxiliary motor to stop the at least one electric auxiliary motor within a predetermined interval when a power take-off switch is moved to the off position while the at least one electric auxiliary motor is activated.

7. The control system of claim 1, further comprising a capacitor in communication with the auxiliary controller to back drive the at least one electric auxiliary motor to stop the at least one electric auxiliary motor within a predetermined interval when a power take-off switch is moved to the off position while the at least one electric auxiliary motor is activated.

8. The control system of claim 1, wherein the drive controller memory comprises the first computer-executable instructions and programmable settings stored therein for manufacturer selection of mowing options of a reverse operating system.

9. A control system for an electric drive system of a vehicle having at least one electric drive motor in communication with a driven wheel of the vehicle, the control system comprising:
    an accelerator of the vehicle capable of causing generation of an accelerator input signal;
    a plurality of sensors mounted within the vehicle and each providing a sensor input signal;
    a drive controller in communication with the at least one electric drive motor to facilitate adjustment thereto based on the accelerator input signal and at least one of the sensor input signals;
    an auxiliary controller in communication with at least one electric auxiliary motor and the drive controller to facilitate adjustment of the at least one electric auxiliary motor; and
    a power supply in communication with the drive controller and the auxiliary controller to provide electrical power for operating the drive controller and the auxiliary controller.

10. The control system of claim 9, wherein the power supply comprises at least one 12 volt battery.

11. The control system of claim 9, wherein the at least one electric auxiliary motor drives at least one cutting blade for mowing.

12. The control system of claim 11, further comprising a reverse operating system switch for activating and deactivating a reverse operating system associated with the at least one cutting blade for mowing.

13. The control system of claim 12, wherein the reverse operating system switch comprises one or more of a momentary switch, a toggle switch, or a key switch position.

14. The control system of claim 9, wherein:
    the drive controller comprises one or more of a drive motor overcurrent sensor or a drive motor overvoltage sensor, wherein:
        the drive motor overcurrent sensor is for monitoring and protecting the at least one electric drive motor from an overcurrent condition; and
        the drive motor overvoltage sensor is for monitoring and protecting the at least one electric drive motor from an overvoltage condition; and
    the auxiliary controller comprises one or more of an auxiliary motor overcurrent sensor or an auxiliary motor overvoltage sensor, wherein:
        the auxiliary motor overcurrent sensor is for monitoring and protecting the at least one electric auxiliary motor from an overcurrent condition; and
        the auxiliary motor overvoltage sensor for monitoring and protecting the at least one electric auxiliary motor from an overvoltage condition.

15. The control system of claim 9, wherein:
- the at least one electric drive motor comprises a drive motor temperature sensor in communication with the drive controller for monitoring a temperature of the at least one electric drive motor; and
- the at least one electric auxiliary motor comprises an auxiliary motor temperature sensor in communication with the auxiliary controller for monitoring a temperature of the at least one electric auxiliary motor.

16. The control system of claim 9, further comprising a vehicle inclination sensor in communication with the drive controller for detecting whether the vehicle is situated on a slope.

17. A control system for an auxiliary mechanism of a utility vehicle, the auxiliary mechanism driven by an electric auxiliary motor, the control system comprising:
- an auxiliary controller in communication with the electric auxiliary motor and a drive controller of the utility vehicle, the auxiliary controller for facilitating adjustment of the electric auxiliary motor; and
- a power take-off switch in communication with the auxiliary controller, the power take-off switch having an on position for activating the electric auxiliary motor and an off position for deactivating the electric auxiliary motor;
- wherein the auxiliary controller is configured to back drive the electric auxiliary motor to stop the electric auxiliary motor within a predetermined interval when the power take-off switch is moved to the off position while the electric auxiliary motor is activated.

18. The control system of claim 17, further comprising a capacitor in communication with the auxiliary controller to back drive the electric auxiliary motor to stop the electric auxiliary motor within the predetermined interval when the power take-off switch is moved to the off position while the electric auxiliary motor is activated.

19. A control system for an electric drive system of a vehicle having at least one electric drive motor in communication with a driven wheel of the vehicle, the control system comprising:
- an accelerator of the vehicle capable of causing generation of an accelerator input signal;
- a plurality of sensors mounted within the vehicle and each providing a sensor input signal;
- a drive controller in communication with the at least one electric drive motor to facilitate adjustment thereto based on the accelerator input signal and at least one of the sensor input signals; and
- an auxiliary controller in communication with at least one electric auxiliary motor and the drive controller to facilitate adjustment of the at least one electric auxiliary motor, wherein the auxiliary controller is configured to back drive the at least one electric auxiliary motor to stop the at least one electric auxiliary motor within a predetermined interval when a power take-off switch is moved to an off position while the at least one electric auxiliary motor is running.

20. The control system of claim 19, further comprising a capacitor in communication with the auxiliary controller to back drive the at least one electric auxiliary motor to stop the at least one electric auxiliary motor within the predetermined interval when the power take-off switch is moved to the off position while the at least one electric auxiliary motor is running.

\* \* \* \* \*